United States Patent [19]

Jacklich, Sr.

[11] Patent Number: 5,211,895
[45] Date of Patent: May 18, 1993

[54] MOLDING PROCESS FOR FORMING A CONCRETE PAVING BLOCK

[76] Inventor: Donald E. Jacklich, Sr., 5108 Yackley Ave., Lisle, Ill. 60532

[21] Appl. No.: 693,672

[22] Filed: Apr. 30, 1991

[51] Int. Cl.⁵ ............... E01C 5/00; B28B 7/22; B28B 3/00
[52] U.S. Cl. ................. 264/71; 264/333; 404/42; 249/13; 249/127; 249/139
[58] Field of Search ............. 404/77, 42, 39, 34, 404/36; 52/723; 106/714, 713; 249/205, 13, 139, 91, 105, 117, 127; 425/458, 428, DIG. 14, 445, 62, 63; 264/333, 71

[56] References Cited

U.S. PATENT DOCUMENTS

| | | | |
|---|---|---|---|
| 3,883,109 | 5/1975 | Hahne | 249/91 |
| 3,904,791 | 9/1975 | Iverson et al. | 427/277 |
| 4,093,690 | 6/1978 | Murray | 264/82 |
| 4,181,286 | 1/1980 | Van Doren | 249/82 |
| 4,451,295 | 5/1984 | Sprouse | 106/738 X |
| 4,744,693 | 5/1988 | Smith | 404/77 |
| 4,756,761 | 7/1988 | Philip et al. | 106/714 |
| 4,761,183 | 10/1988 | Clarke | 106/714 X |
| 5,033,906 | 7/1991 | Jordan | 404/124 |
| 5,062,610 | 11/1991 | Woolford et al. | 425/413 X |

FOREIGN PATENT DOCUMENTS

| | | | |
|---|---|---|---|
| 0904314 | 6/1986 | Belgium | 404/42 |
| 7415523 | 6/1976 | Netherlands | 404/42 |
| 2012332 | 7/1979 | United Kingdom | 404/42 |

Primary Examiner—Ramon S. Britts
Assistant Examiner—Nancy Connolly
Attorney, Agent, or Firm—Patnaude, Videbeck & Marsh

[57] ABSTRACT

A molded and cured concrete paving member for paving driveways, walkways, patios, plazas and the like, comprising portland cement, a coal slag aggregate, water and an acrylic additive. The blend is poured into a non-porous, high gloss polyvinylchloride (PVC) mold in a relative dry mix and is vibrated to drive the portland cement to the bottom of the mold and to suspend the aggregate into chemical suspension. This also drives the lighter weight water to the top of the molding configuration, which top, due to the configuration or orientation of the mold, ultimately becomes the bottom of the paving member. The molding is accomplished while hanging from a frame in a so-called bag mold so that when the concrete expands and contracts in the relatively flexible mold during the hydration curing process a bond of the concrete to the PVC mold is maintained. The non-porosity of the high gloss mold surface and induced vibration pull the portland cement to the bottom of the mold cavity and suspend the aggregate. This, then, gives rise to an advantageous high gloss ceramic-like finish.

9 Claims, 1 Drawing Sheet

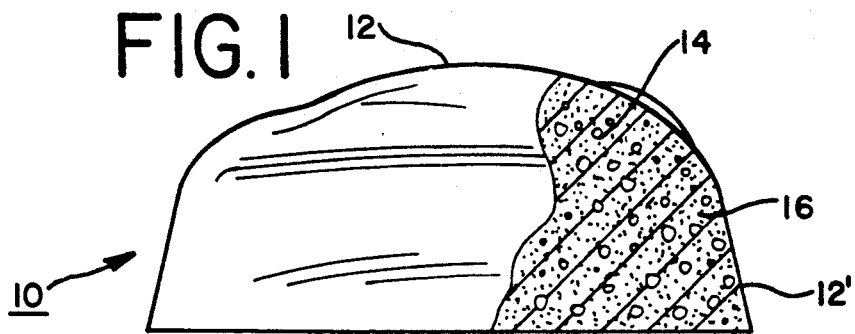
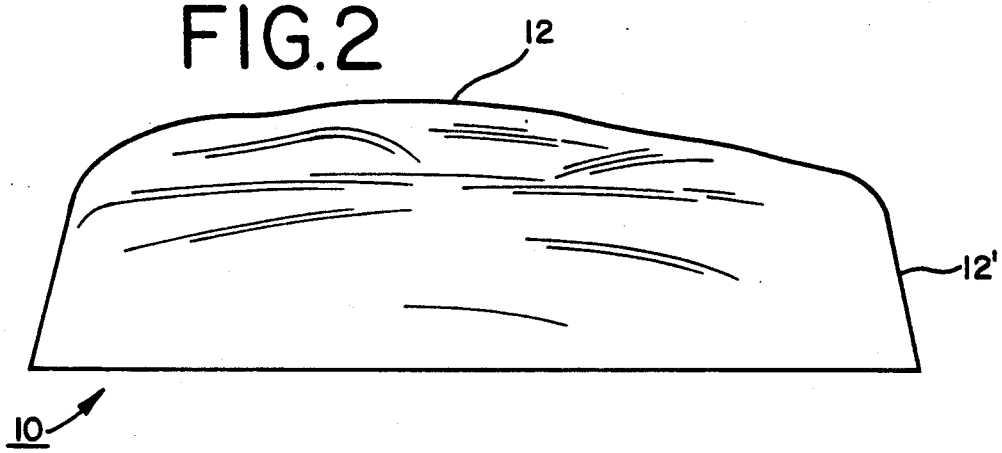
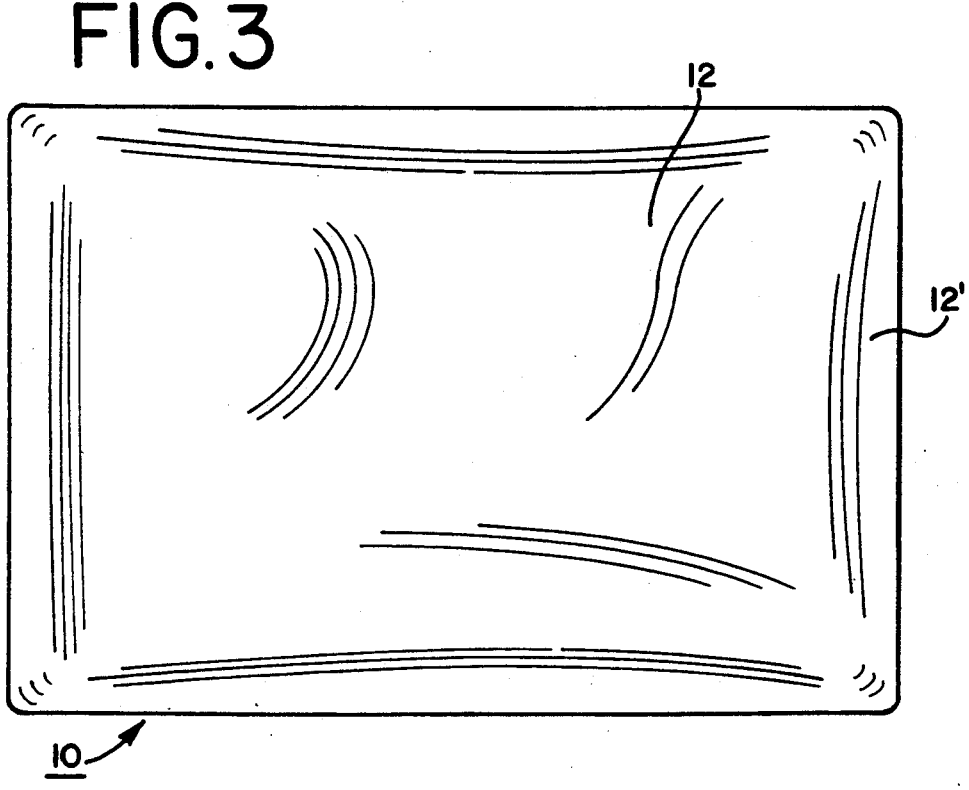

MOLDING PROCESS FOR FORMING A CONCRETE PAVING BLOCK

BACKGROUND OF THE INVENTION

This invention relates to a molded and cured concrete paving member for paving or re-paving driveways, walkways, patios, plazas and the like. The paving member is blended with special additives to enhance hardness and durability and is provided in a selected color and is sized and shaped to provide a relatively small sized member having a relatively high PSI rating.

Paving members such as cobblestones for paving driveways, highways, walkways and the like are notoriously known and have been widely used in the art for ages. These known cobblestones have the disadvantage in that they are difficult to produce, are indigenous to given geological areas, and are limited in terms of their colors and applications as well as their strength in certain given applications. The high cost of cobblestones is also well known.

These and other disadvantages are overcome by the present invention wherein there is provided a concrete paving member emulative of a cobblestone, that can be provided in a given special size, that can be colored to suit a given application, and that provides the worn appearance of the time-honored cobblestones of the past. The paving member of the present invention also provides substantial axial strength and abrasive resistance which avoids breaking while preserving its decorative appearance.

SUMMARY OF THE INVENTION

Briefly, a paving member is provided including a concrete member comprising a blend of portland cement, an aggregate, water, and a colorant. The blend is provided in a chemical suspension and the entire mass of the paving member is imbued with the portland cement and the colorant.

BRIEF DESCRIPTION OF THE DRAWING

The advantages of this invention will become more readily appreciated as the same becomes completely understood by reference to the following detailed description when taken in conjunction with the accompanying drawing wherein:

FIG. 1 is an end view in partial cross section of the paving member in accordance with the teachings of the present invention;

FIG. 2 is a side view of the paving member of FIG. 1; and,

FIG. 3 is a top view of the paving member in accordance with the present invention and in accordance with FIGS. 1 and 2.

DETAILED DESCRIPTION

Referring now to FIG. 1 there is shown an end view of a paving member in accordance with the present invention and shown in partial cross section to illustrate the internal aggregate composition of the material therein. Paving member 10 includes an external high gloss, ceramic-like surface 12 and a cured internal composition consisting of coal slag aggregate in a plurality of sizes which is suspended in the mass. Aggregate 14 preferably comprises multi-sized, sub-angular (non-round) black, shiny, hard coal slag. Suitable colored portland cement 16 fills the voids between the aggregate materials. The portland cement 12' along the sides of member 10 and the top 12 is provided by the non-porous, high gloss, yet flexible surface of a polyvinylchloride (PVC) mold as will be explained more fully hereinafter.

As can be seen in FIG. 2, the upper surface of paving member 10 is provided in a relief with varying elevations so as to simulate the appearance of a worn cobblestone of the type that heretofore has been utilized in these applications. Referring now to FIG. 3 there is shown a top view of a paving member in accordance with the present invention illustrating the relative dimensions and the relief portions or elevational differentials exhibited across the upper surface of paving member 12.

In currently preferred practice, each paving member 10 contains one part portland cement, three parts aggregate, and one-third part water. This provides an unusually dry mix that normally would be unworkable in anything other than a small pour (such as on the order of 1.2 lbs) into a non-porous, high-gloss flexible mold that is concomitantly vibrated. The blend further comprises approximately one-fiftieth part colorant (depending on the color intensity desired) and one-one hundredth part acrylic additive. The aggregate preferably is multi-sized, sub-angular (that is, non-round) black, shiny hard coal slag. The angularity of the aggregate enhances the strength of the completed paving member. The multi-sizing fills the voids thereby enhancing the strength of the completed paving member. The black shiny surface of the aggregate ensures that upon normal wear-off of the surface portland cement, the final appearance of the product is in the nature of colored granite rather than concrete. The portland cement is colored with an iron oxide colorant. The colorant is added at the time of mixing prior to the molding step and no attempt is made to match the color of any two batches of the paving members thereby to preserve the random nature of their external appearance. The paving members preferably are on the order of 3.5 inches by 5 inches and 1.5 inches thick though other dimensions are possible. The relatively short size of the paving members along with their thickness and the resulting PSI of over six thousand pounds function to avoid breaking of the paving member.

In the manufacturing process, the blend is prepared and poured into a non-porous polyvinylchloride (PVC) mold and is simultaneously vibrated so that the mass "plasticized" (loses its stiffness), the portland cement gravitates to the bottom of the mold and the aggregate suspends itself in a true chemical suspension. This plasticizing through vibration also sends the lighter weight water to the top of the mass which eventually forms the bottom portion of the paving member. This process is important because it provides added strength to the surface of the paver because the water to cement ratio is further reduced at the bottom of the mass and it enhances the overall abrasive strength of the paving member. The non-porous and therefore smooth mold receives the portland against it but accepts none of the portland into it itself. The result then being a perfectly smooth surface of cured concrete. Since the portland cement is finer in grade than talcum powder, the resulting surface typically is exceptionally smooth so as to be mirror-like. At this point it will be appreciated by those skilled in the art that the non-porosity and flexibility of the high gloss mold surface along with the fact that it is hung in a bag-like fashion as well as the vibration of the concrete plasticizing it and allowing gravity to pull the portland to the bottom of the mold cavity and suspend the aggregate gives the paving member its final appearance that of a shiny ceramic-like finish--exactly that of a worn cobblestone's patina. The paving member is removed from the mold and stored in a special humidor which allows slow hydration and thus enhances the curing process. After five days, the paving member is ready for delivery to the installation site.

In currently preferred practice, the aggregate is multi-sized, angular, black, shiny coal slag. The angularity of the aggregate enhances the strength of the resulting paving member. The multi-sizing of the aggregate fills the various voids thereby enhancing the strength of the paving member which contributes to the resulting strength which has been found to be in the order of 6,000 PSI. The black shiny surface of the aggregate ensures that a part of normal wear-off of the surface portland cement the final look of the resulting paving member is that of colored granite rather than concrete.

During the manufacturing process, the blend of portland cement, the coal slag aggregate, water, and an acrylic additive are provided. The blend is poured into a non-porous, high-gloss PVC mold in a relatively dry mix and is vibrated to drive the portland cement to the bottom of the mold and to suspend the aggregate into chemical suspension. This then drives the lighter weight water to the top of the molding configuration, which top, due to the configuration or orientation of the mold, ultimately becomes the bottom of the paving member. The molding is accomplished while hanging from a frame in a so-called bag mold so that when the concrete expands and contracts in the relatively flexible mold during the hydration and curing process, the bond of portland cement to the PVC mold is maintained. The non-porosity of the high-gloss mold surface and the induced vibration pull the portland cement to the bottom of the mold cavity and suspend the aggregate. This then gives rise to an advantageous high-gloss ceramic-like finish. In this regard, it will be appreciated by those skilled in the art that a so-called bag mold typically is a container of relatively thin PVC which is hung from a wood frame. The box hangs with a given load which in accordance with the present invention, is on the order of 1.2 pounds of concrete, and which is important. Otherwise, if air were to get between the concrete and the plastic curing hydration, loss of the high-gloss sheen of the concrete would result. If the mold were sitting rather than hanging, the weight of concrete would stress the plastic and pull it away from the surface of the hardening mass.

What has been taught, then, is a concrete paving member which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A method for making a concrete paving member comprising a blend of portland cement, an aggregate, water and a colorant, said method comprising the steps of:

providing a blend of portland cement, an aggregate, water and a colorant;

pouring the blend into a non-porous, high-gloss, flexible polyvinylchloride mold;

vibrating the mold to drive the portland cement to the closed bottom of the mold and to suspend the aggregate into chemical suspension while driving the water toward the top of the mold;

positioning the mold within a frame with the bottom of the mold suspended in a bag configuration to maintain the bond of the portland cement to the mold while the concrete expands and contracts during a hydration curing process to give the surface of the cured paving member a shiny polished appearance; and removing the cured paving member form the mold.

2. The method according to claim 1 wherein the bottom of said mold is provided with an irregular sinuous surface.

3. The method according to claim 1 wherein the bottom of said mold is provided with areas of differing depth dimensions wherein the cured paving member resembles a cobblestone.

4. The method according to claim 3 wherein said mold includes rounded corners at said bottom to provide a gap between adjacent paving members once removed from said mold.

5. The method according to claim 1 including the step of storing the removed cured paving member in a humidor to slow hydration and enhance curing.

6. The method according to claim 1 wherein said polyvinylchloride mold includes flexible wall and bottom portions to retain contact with the concrete during expansion and contraction of said concrete during said hydration curing process.

7. The method according to claim 1 wherein said aggregate comprises black coal slag of varying sizes.

8. The method according to claim 1 wherein said colorant comprises an iron oxide colorant.

9. The method according to claim 1 wherein said blend includes an acrylic additive.

* * * * *